US009944229B2

(12) United States Patent
Kelly et al.

(10) Patent No.: US 9,944,229 B2
(45) Date of Patent: *Apr. 17, 2018

(54) AXLE ASSEMBLY HAVING A BOWL COVER

(71) Applicant: ArvinMeritor Technology, LLC, Troy, MI (US)

(72) Inventors: John Kelly, Grosse Pointe Farms, MI (US); Stephen Doyle, Independence Township, MI (US); Dale Eschenburg, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/819,509

(22) Filed: Aug. 6, 2015

(65) Prior Publication Data
US 2016/0046151 A1 Feb. 18, 2016

Related U.S. Application Data

(60) Provisional application No. 62/037,811, filed on Aug. 15, 2014.

(51) Int. Cl.
*B60B 35/12* (2006.01)
*B60B 35/16* (2006.01)
(Continued)

(52) U.S. Cl.
CPC .............. *B60R 1/002* (2013.01); *B60B 35/16* (2013.01); *B60B 35/163* (2013.01);
(Continued)

(58) Field of Classification Search
CPC ..... B60K 17/16; B60B 35/125; B60B 35/007; B60B 35/16; B60B 35/12; B60R 1/002; F16H 57/037
See application file for complete search history.

(56) References Cited

U.S. PATENT DOCUMENTS 3,153,464 A * 10/1964 Nelson ................... B60K 17/16
184/11.2
3,502,176 A * 3/1970 Terry ................... F16H 57/0483
184/11.1
(Continued)

FOREIGN PATENT DOCUMENTS

CN 101004214 A 7/2007
CN 101027507 A 8/2007
(Continued)

OTHER PUBLICATIONS

The State Intellectual Property Office, Chinese Office Action for the corresponding Chinese Patent Application No. 201510501663.6 dated Apr. 25, 2017.
(Continued)

Primary Examiner — Vinh Luong
(74) Attorney, Agent, or Firm — Brooks Kushman P.C.

(57) ABSTRACT

An axle assembly having an axle housing and a bowl cover. The axle housing may have a center portion that may define a bowl opening and a differential carrier opening that may receive a differential. The bowl cover may be mounted to the axle housing and may cover the bowl opening.

22 Claims, 9 Drawing Sheets

(51) Int. Cl.
*B60R 1/00* (2006.01)
*B60B 35/00* (2006.01)
*F16H 57/031* (2012.01)
*F16H 57/037* (2012.01)
*F16H 57/04* (2010.01)
*F16H 57/02* (2012.01)

(52) U.S. Cl.
CPC ......... *F16H 57/031* (2013.01); *F16H 57/037* (2013.01); *F16H 57/0402* (2013.01); *F16H 57/045* (2013.01); *F16H 57/0409* (2013.01); *F16H 57/0449* (2013.01); *F16H 57/0457* (2013.01); *F16H 57/0483* (2013.01); *B60B 35/166* (2013.01); *B60Y 2200/10* (2013.01); *F16H 57/0456* (2013.01); *F16H 2057/02052* (2013.01)

(56) References Cited

U.S. PATENT DOCUMENTS

| | | | |
|---|---|---|---|
| 3,847,249 A | 11/1974 | Oehring | |
| 5,839,327 A | 11/1998 | Gage | |
| 6,553,865 B1 * | 4/2003 | Endreszl | F16H 57/027 74/606 A |
| 6,997,284 B1 | 2/2006 | Nahrwold | |
| 7,004,277 B2 * | 2/2006 | Pollock | F16H 57/037 180/346 |
| 7,178,426 B2 * | 2/2007 | Turner | F16H 57/0447 184/11.1 |
| 7,240,576 B1 | 7/2007 | Perry | |
| 7,461,454 B2 | 12/2008 | Melton et al. | |
| 8,608,356 B1 * | 12/2013 | McGean | B60Q 1/24 362/500 |
| 2003/0110885 A1 | 6/2003 | Beutler | |
| 2004/0149519 A1 | 8/2004 | Slesinski | |
| 2004/0226766 A1 | 11/2004 | Cook et al. | |
| 2005/0093364 A1 * | 5/2005 | Li | B60B 35/003 301/124.1 |
| 2006/0032895 A1 * | 2/2006 | Durand | B60B 35/16 228/234.1 |
| 2006/0063633 A1 | 3/2006 | Turner et al. | |
| 2007/0246997 A1 | 10/2007 | Jenkinson et al. | |
| 2008/0106055 A1 | 5/2008 | Pinkos et al. | |
| 2008/0295643 A1 | 12/2008 | Zalanca et al. | |
| 2010/0043594 A1 | 2/2010 | Hilker et al. | |
| 2014/0158481 A1 | 6/2014 | Philpott | |
| 2016/0046150 A1 * | 2/2016 | Kelly | B60B 35/125 156/60 |
| 2016/0046151 A1 * | 2/2016 | Kelly | B60B 35/16 74/607 |
| 2016/0047461 A1 * | 2/2016 | Kelly | F16H 57/0483 74/607 |

FOREIGN PATENT DOCUMENTS

| | | | | |
|---|---|---|---|---|
| CN | 202986679 U | | 6/2013 | |
| CN | 103764407 A | | 4/2014 | |
| EP | 0192316 A1 | | 8/1986 | |
| EP | 0763676 A1 | | 3/1997 | |
| EP | 1510364 A2 | * | 3/2005 | .......... B60B 35/125 |
| EP | 1553330 A2 | | 7/2005 | |
| EP | 1808325 A1 | | 7/2007 | |
| WO | WO 2017082272 A1 | * | 5/2017 | .......... B60B 35/125 |

OTHER PUBLICATIONS

European Patent Office, Extended Search Report for the corresponding European Patent Application No. 15180582.7 dated Feb. 9, 2016.

* cited by examiner

AXLE ASSEMBLY HAVING A BOWL COVER

CROSS-REFERENCE TO RELATED APPLICATIONS

This application claims the benefit of U.S. provisional application Ser. No. 62/037,811, filed Aug. 15, 2014, the disclosure of which is hereby incorporated in its entirety by reference herein.

TECHNICAL FIELD

This patent application relates to an axle assembly having a bowl cover.

BACKGROUND

An axle housing assembly having an integral bowl portion is disclosed in U.S. Pat. No. 7,461,454.

SUMMARY

In at least one embodiment, an axle assembly is provided. The axle assembly may include an axle housing and a bowl cover. The axle housing may have a center portion that may define a bowl opening and a differential carrier opening. The differential carrier opening may receive a differential that may have a ring gear. The bowl cover may be mounted to the axle housing. The bowl cover may have a first wall, a second wall, and a ring gear receiving portion. The first wall and the second wall may be spaced apart from each other and may at least partially cover the bowl opening. The ring gear receiving portion may be disposed between the first wall and the second wall. The ring gear receiving portion may extend away from the axle housing and may receive the ring gear.

In at least one embodiment, an axle assembly is provided. The axle assembly may include an axle housing and a bowl cover. The axle housing may have a center portion that may define a bowl opening and a differential carrier opening. The differential carrier opening may receive a differential that may have a ring gear. The bowl cover may be mounted to the axle housing. The bowl cover may have a perimeter surface, a flange, and a bowl. The perimeter surface may extend around the bowl cover and may be radially disposed about a center axis. The flange may extend from the perimeter surface and may facilitate mounting of the bowl cover to the axle housing. The bowl may extend from the flange and may cover the bowl opening. The bowl may be a substantially spherical cap that may be centered about the center axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
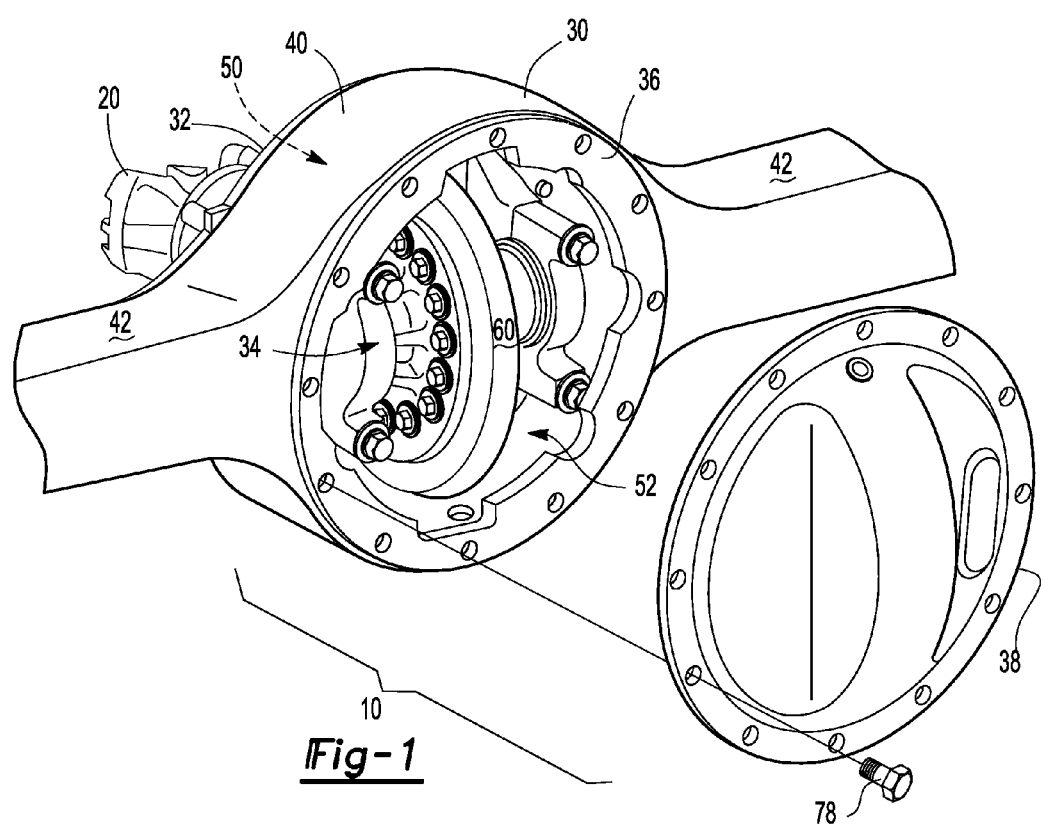
FIG. 1 is a perspective view of an axle assembly having a bowl ring and a bowl cover.

Referring to FIG. 1, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels.

The axle assembly 10 may be a drive axle that may provide torque to one or more traction wheel assemblies that may include a tire mounted on a wheel. The drive axle may receive torque from a power source, such as an engine. For example, the power source may be operatively coupled to an input of a transmission and an output of the transmission may be coupled to an input yoke 20 of the axle assembly 10, such as with a drive shaft.

One or more axle assemblies 10 may be provided with the vehicle. For example, the axle assembly 10 may be part of a multi-axle configuration that may include a plurality of axle assemblies that may be connected in series. For example, two axle assemblies may be provided in a tandem axle configuration. The first axle assembly or axle assembly that may be first in the series may be referred to as a forward-rear axle assembly. The second axle assembly may be referred to as a rear-rear axle assembly. An output of the first axle assembly may be selectively coupled to an input of the second axle assembly, such as with a prop shaft.

In at least one embodiment, the axle assembly 10 may include an axle housing 30, a differential carrier 32, a differential 34, a bowl ring 36, and a bowl cover 38.

The axle housing 30 may receive various components of the axle assembly 10. In addition, the axle housing 30 may facilitate mounting of the axle assembly 10 to the vehicle. In at least one embodiment, the axle housing 30 may include a center portion 40 and a pair of arm portions 42.

The center portion 40 may be disposed proximate the center of the axle housing 30 and may receive at least a portion of the differential 34. The center portion 40 may define a differential carrier opening 50 and a bowl opening 52.

The differential carrier opening 50 may face toward the differential carrier 32. The differential 34 may be inserted through the differential carrier opening 50 to install the differential 34 into the center portion 40.

The bowl opening 52 may be disposed opposite the differential carrier 32 and the differential carrier opening 50. The bowl opening 52 may provide access to internal components of the axle assembly 10, such as the differential 34, to facilitate assembly of the axle assembly 10 and facilitate maintenance without removing the differential carrier 32 and differential 34 from the axle housing 30.

The arm portions 42 may extend in opposite lateral directions from the center portion 40. Each arm portion 42 may receive and may rotatably support an axle that may transmit torque from the differential 34 to a corresponding traction wheel assembly.

The differential carrier 32 may support the differential 34. The differential carrier 32 may be mounted on the axle housing 30 proximate the differential carrier opening 50. For example, the differential carrier 32 may be mounted to the axle housing 30 by inserting the differential 34 through the differential carrier opening 50 and positioning the differential carrier 32 against the center portion 40 of the axle housing 30. Then, the differential carrier 32 may be attached to the center portion 40 of the axle housing 30 with a plurality of fasteners, such as bolts.

The differential 34 may be configured to transmit torque to its associated traction wheel assemblies via the axles. The differential 34 may also permit the traction wheel assemblies associated with the axle assembly 10 to rotate at different velocities. An abbreviated description of the differential 34 is provided below to facilitate understanding of the operation of the axle assembly 10 and differential 34.

The input yoke 20 may be operatively coupled to a torque source as previously discussed. The input yoke 20 may be disposed on and may rotate an input shaft. The input shaft may transmit torque to a drive pinion, either directly or via intervening gears. The drive pinion may transmit torque to a ring gear 60 of the differential 34. The ring gear 60 may transmit torque to a differential gear set that may be operatively connected to the axles. As such, the differential gear set may receive torque via the ring gear and provide torque to the axles. The axles may transmit torque to corresponding traction wheel assemblies. The input shaft may also be operatively connected to an interaxle differential unit when multiple drive axles are connected in series. The interaxle differential unit may compensate for speed differences between different drive axle assemblies.

Figure 2:
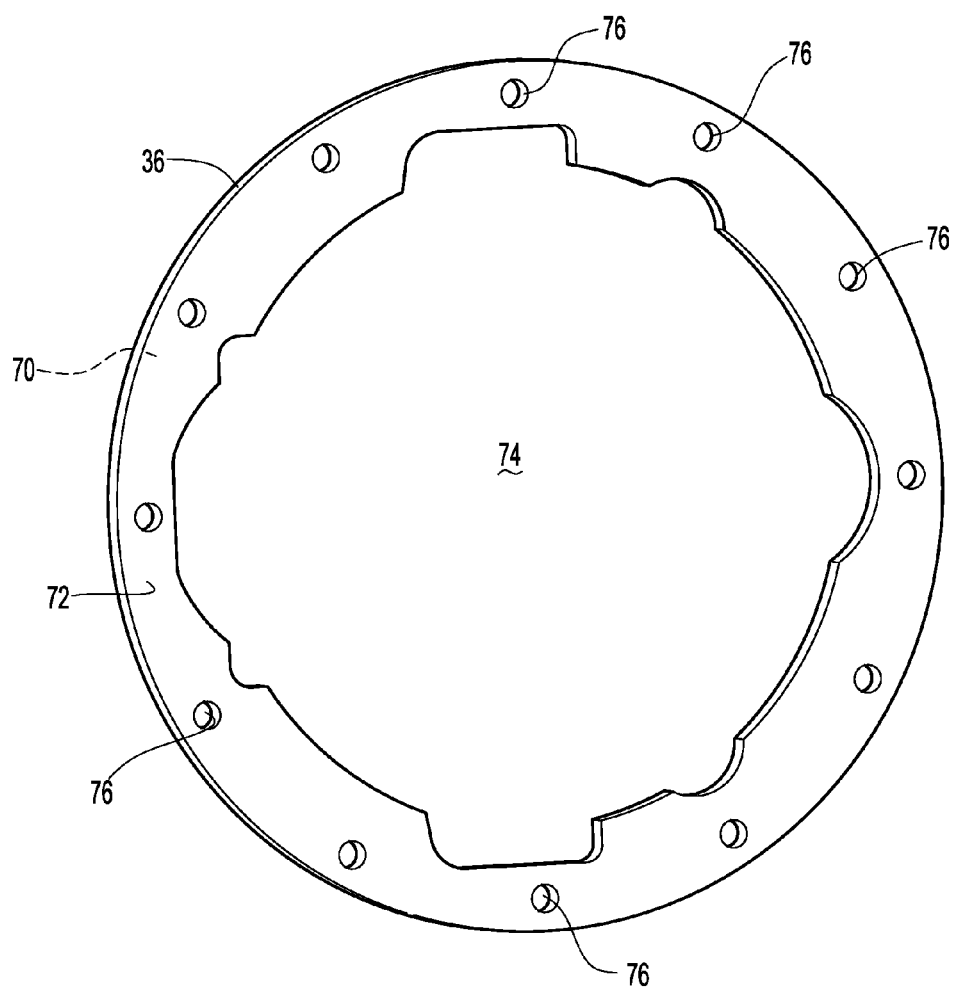
FIG. 2 is a perspective view of the bowl ring of FIG. 1.

Referring to FIGS. 1 and 2, the bowl ring 36 may facilitate mounting of the bowl cover 38 to the axle housing 30. The bowl ring 36 may be disposed on the center portion 40 of the axle housing 30 between the axle housing 30 and the bowl ring 36. In addition, the bowl ring 36 may be fixedly positioned with respect to the axle housing 30. For example, the bowl ring 36 may be fixedly mounted to the axle housing 30 in any suitable manner, such as by welding, with fasteners, with an adhesive, or combinations thereof. The bowl ring 36 may be made of any suitable material, such as a metal alloy like steel. In at least one embodiment, the bowl ring 36 may extend continuously around the bowl opening 52 and may have a first surface 70, a second surface 72, a bowl ring hole 74, and a set of mounting holes 76 as is best shown in FIG. 2.

The first surface 70 may face toward and may engage the center portion 40 of the axle housing 30. The first surface 70 may be substantially planar in one or more embodiments.

The second surface 72 may be disposed opposite the first surface 70. The second surface 72 may face toward and may engage the bowl cover 38. The second surface 72 may be substantially planar and may be disposed parallel to the first surface 70 in one or more embodiments.

The bowl ring hole 74 may extend from the first surface 70 to the second surface 72. The bowl ring hole 74 may generally extend around the bowl opening 52 of the axle housing 30.

The set of mounting holes 76 may extend from the second surface 72 toward the first surface 70. The mounting holes 76 may be spaced apart from each other and may be arranged around and may be spaced apart from the bowl ring hole 74. The mounting holes 76 may facilitate mounting of the bowl cover 38 to the bowl ring 36. For example, the mounting holes 76 may be threaded holes that may receive corresponding fasteners 78. In addition, the mounting holes 76 may be positioned such that the mounting holes 76 may terminate in the bowl opening 52. As such, a fastener 78 may extend into the bowl opening 52 and may be spaced apart from the axle housing 30 in one or more embodiments. The mounting holes 76 may be omitted if the bowl cover 38 is attached to the bowl ring 36 in a different manner, such as with an adhesive or other bonding material.

The bowl cover 38 may be disposed on the bowl ring 36. Moreover, the bowl cover 38 may be configured to extend across and cover the bowl opening 52 and the bowl ring hole 74. The bowl cover 38 may be made of a different material than the axle housing 30 and the bowl ring 36. For instance, the bowl cover 38 may be made from a composite material like a fiber reinforced polymer. A fiber reinforced polymer may include fibers, such as carbon fiber or glass fiber, that may be embedded in a resin, such as a polymeric resin. Such a composite material may reduce the weight of the bowl cover 38 as compared to a bowl cover 38 made of metal or a metal alloy, such as steel. In addition, a composite material may be formed into shapes and may be provided with features and/or functionality that may be difficult or infeasible to provide with a metal or metal alloy. For example, steel may not be capable of being stretched or formed into configurations that may be provided with a composite material without compromising strength and/or sealing capability.

Figure 3:
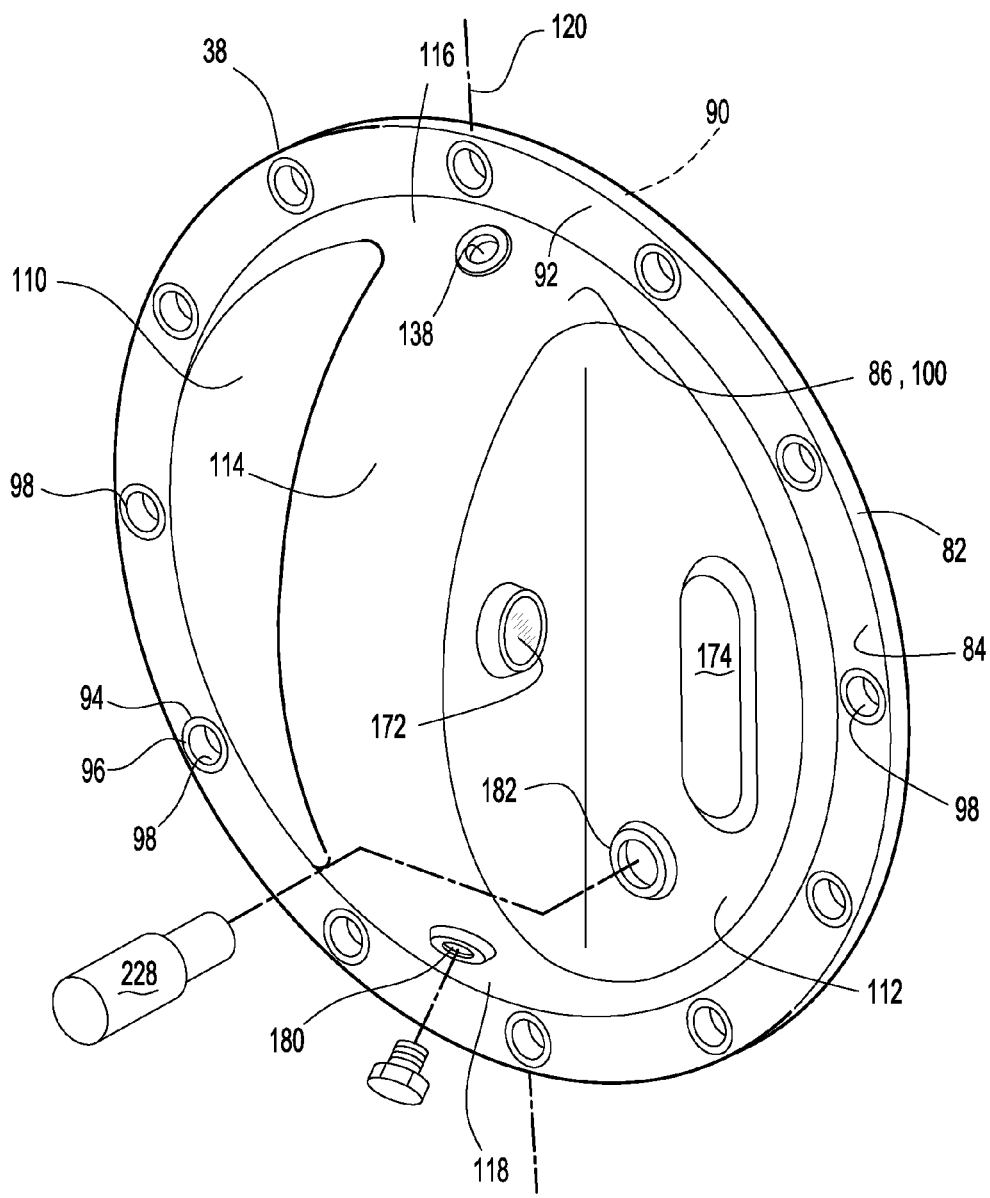
FIG. 3 is perspective view of the bowl cover of FIG. 1.
Figure 4:
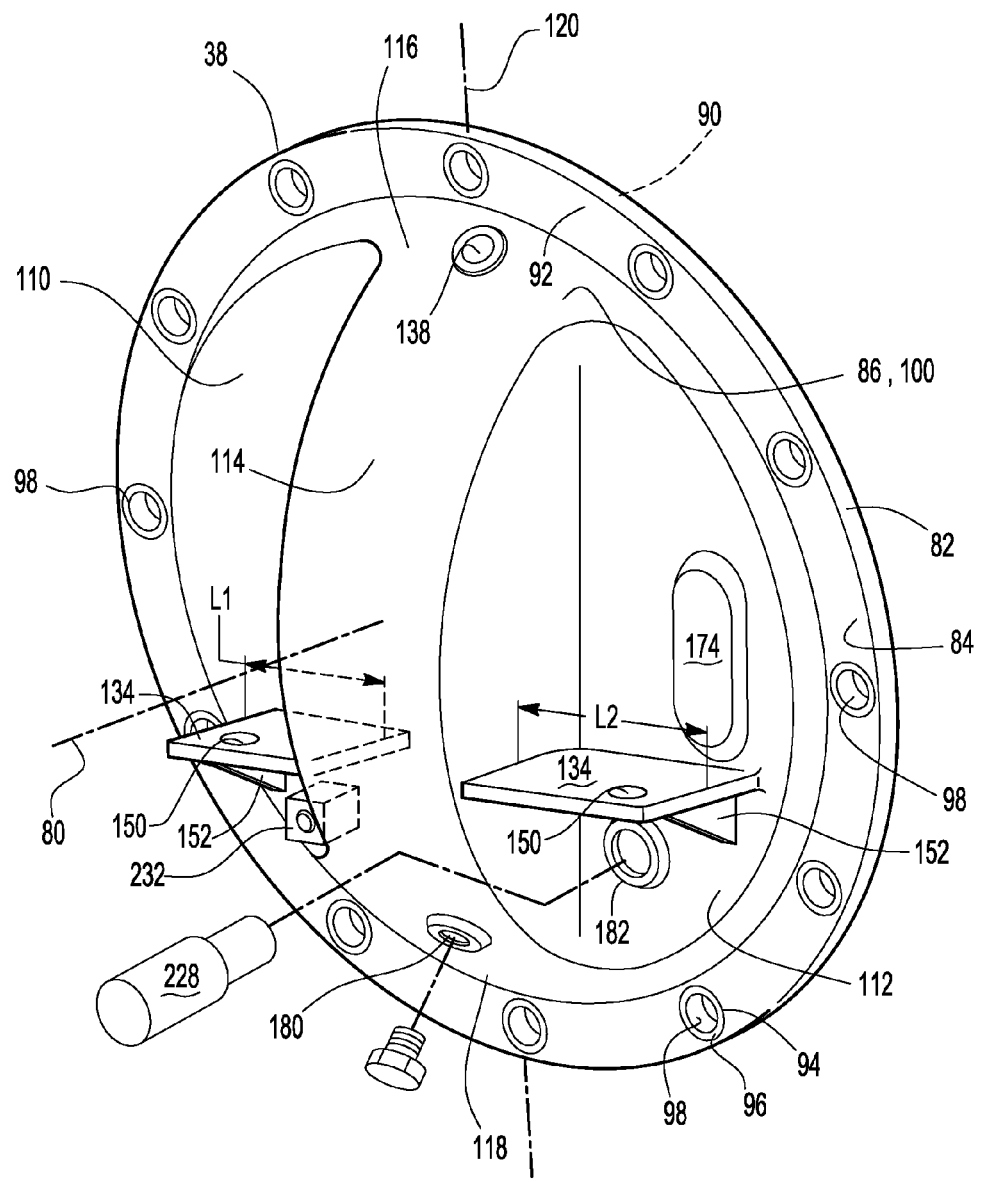
FIG. 4 is a perspective view of a second embodiment of a bowl cover.
Figure 5:
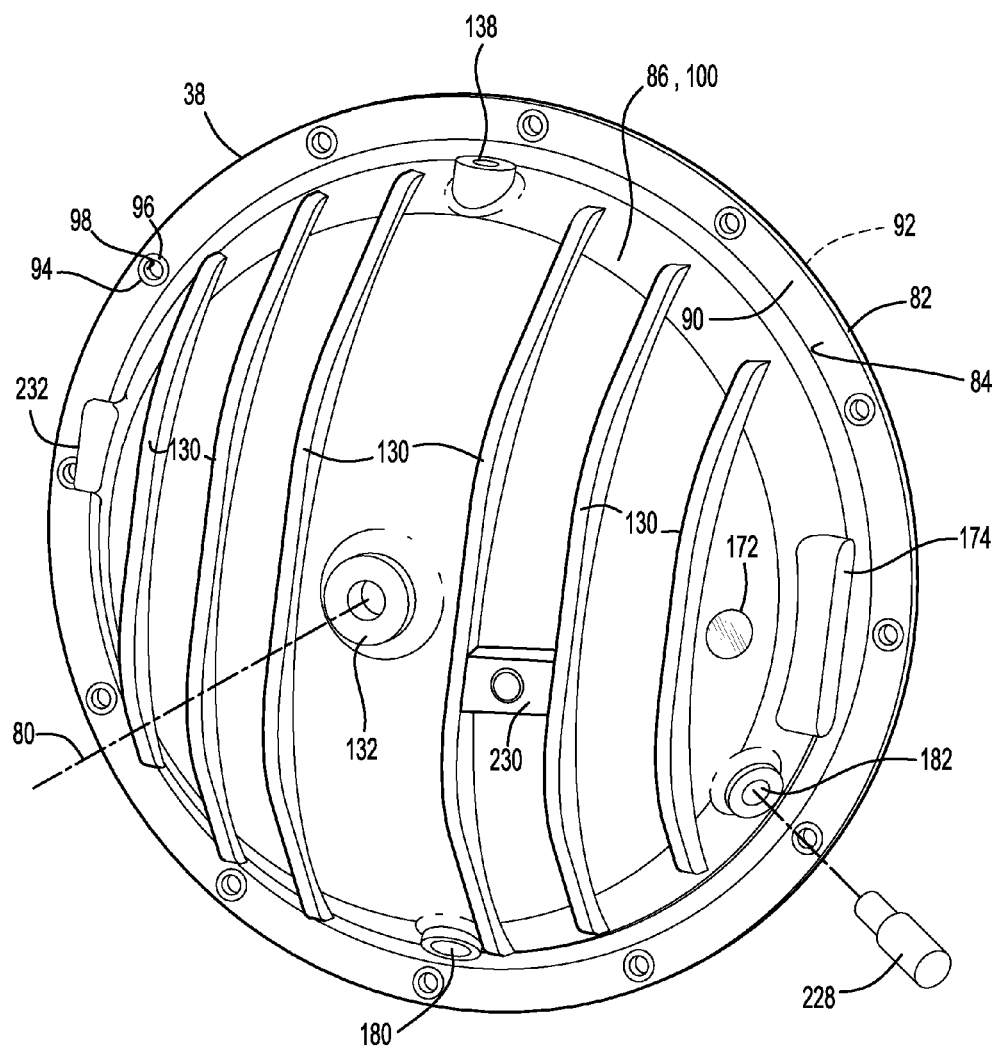
FIGS. 5 and 6 are perspective views of a third embodiment of a bowl cover.

The bowl cover 38 may be provided in various configurations and may have various combinations of features. Two main types of bowl covers are shown in the Figures. FIGS. 3 and 4 show examples of a first type or "low volume" configuration in which most of the bowl cover 38 does not extend far from the bowl ring 36 to reduce its internal volume. Such a configuration may reduce lubricant volume in the axle assembly 10, which may help reduce lubricant drag forces that may be exerted components of the differential 34 like the ring gear 60 and may help improve vehicle fuel economy. FIGS. 5-9 show examples of a second type or "spherical dome" configuration in which the bowl cover 38 has a bowl that may be generally configured as a portion of a sphere or a substantially spherical cap (i.e., a portion of a sphere cut off by a plane that may not pass through the center of the sphere). Such a spherical dome or spherical cap may be centered about a center axis 80 as is best shown in FIG. 5. For each type of bowl cover 38, a portion of the differential 34, such as the ring gear 60, may extend through the bowl ring 36 and may be received in the bowl cover 38. In addition, each type of bowl cover 38 may include a perimeter surface 82, a flange 84, and a bowl 86.

The perimeter surface 82 may extend around the perimeter of the bowl cover 38. The perimeter surface 82 may extend away from the bowl ring 36 and may be radially disposed about the center axis 80 in one or more embodiments.

The flange 84 may facilitate mounting of the bowl cover 38 to the axle housing 30 or bowl ring 36. The flange 84 may extend from the perimeter surface 82 toward the center axis 80 or toward the center of the bowl cover 38. For example, the flange 84 may extend from the perimeter surface 82 to the bowl 86. In at least one embodiment, the flange 84 may have a first flange surface 90, a second flange surface 92, and a set of fastener holes 94.

The first flange surface 90 may face toward and may engage the bowl ring 36. For example, the first flange surface 90 may be disposed on the second surface 72 of the bowl ring 36. As such, the bowl cover 38 may engage the bowl ring 36 and may be spaced apart from and may not engage the axle housing 30. The first flange surface 90 may be substantially planar and may be disposed substantially parallel to the second surface 72.

The second flange surface 92 may be disposed opposite the first flange surface 90. The second flange surface 92 may be substantially planar and may be disposed substantially parallel to the first flange surface 90.

The set of fastener holes 94 may extend from the first flange surface 90 to the second flange surface 92. The fastener holes 94 may be spaced apart from each other and each fastener hole 94 may be aligned with a corresponding mounting hole 76 of the bowl ring 36. The fastener holes 94 may facilitate mounting of the bowl cover 38 to the bowl ring 36. For example, the fastener holes 94 may receive a corresponding fastener 78 that may couple the bowl cover 38 to the bowl ring 36. For instance, a fastener 78 may extend through the fastener hole 94 to a corresponding mounting hole 76. The fasteners 78 may be removed to permit removal of the bowl cover 38 from the bowl ring 36 and allow access to internal components of the axle assembly 10 for servicing and/or maintenance. Such functionality may not be realized with a steel bowl cover that may be welded to the axle housing and therefore may not be easily or cost-effectively removed. It is also contemplated that the bowl cover 38 may be mounted directly to the axle housing 30. In addition, the fastener holes 94 may be omitted if the bowl cover 38 is attached in a different manner, such as with an adhesive or other bonding material.

The fastener hole 94 may also receive a reinforcement insert 96 that may be fixedly positioned in the fastener hole 94. The reinforcement insert 96 may extend through the fastener hole 94 from the first flange surface 90 to the second flange surface 92. The reinforcement insert 96 may have a reinforcement insert hole 98 through which the fastener 78 may extend. The reinforcement insert 96 may be made of a material that is harder to compress than the flange 84. For instance, the reinforcement insert 96 may be made of a metal alloy like steel and may be molded into the bowl cover 38. The reinforcement insert 96 may engage the head of the fastener 78 when the fastener 78 is tightened and may transmit force exerted by a head of the fastener to the bowl ring 36 to inhibit deformation of the flange 84.

The bowl 86 may be disposed in the center of the bowl cover 38 and may be encircled or completely surrounded by the flange 84. The bowl 86 may extend from the flange 84 and may cover the bowl opening 52. In addition, the bowl 86 may be offset from the flange 84 and may extend away from the axle housing 30 proximate the bowl opening 52. In each bowl cover configuration, the bowl 86 may have an outer surface 100 and an inner surface 102.

The outer surface 100 may face away from the axle housing 30. The outer surface 100 may be a visible exterior surface of the bowl 86.

The inner surface 102 may be disposed opposite the outer surface 100. The inner surface 102 may face toward the axle housing 30 and the differential 34.

Other attributes of the bowl 86 may vary between the first type of bowl cover and the second type of bowl cover.

Referring to FIGS. 3 and 4, the bowl 86 of the first type of bowl cover 38 is shown. The bowl 86 may have a first wall 110, a second wall 112, and a ring gear receiving portion 114.

The first wall 110 may extend from the flange 84 to the ring gear receiving portion 114 and may partially cover the bowl opening 52. As such, the flange 84 may extend around the first wall 110. The first wall 110 may be offset from the flange 84 such that the first wall 110 may be disposed further from the axle housing 30 than the flange 84.

The second wall 112 may be disposed on an opposite side of the ring gear receiving portion 114 from the first wall 110. As such, the second wall 112 may be spaced apart from the first wall 110 and a different portion of the flange 84 may extend around the second wall 112. The second wall 112 may extend from the flange 84 to the ring gear receiving portion 114 and may also partially cover the bowl opening 52. The second wall 112 may also be offset from the flange 84 such that the second wall 112 may be disposed further from the axle housing 30 than the flange 84. The second wall 112 may be aligned with or may be disposed substantially coplanar with the first wall 110 in one or more embodiments.

The ring gear receiving portion 114 may be disposed between the first wall 110 and the second wall 112. The ring gear receiving portion 114 may extend in a generally vertical direction and may have a top end 116 and a bottom end 118 disposed opposite the top end 116. The top end 116 and the bottom end 118 may be disposed adjacent to different portions of the flange 84. As is best shown in FIG. 4, the ring gear receiving portion 114 may not be centered about the center axis 80 or may be offset from a center line 120 of the bowl cover 38 that may be disposed perpendicular to the center axis 80. The ring gear receiving portion 114 may extend further away from the axle housing 30 than the flange 84, the first wall 110, and the second wall 112. The ring gear 60 may be received in the ring gear receiving portion 114.

Referring to FIGS. 5-9, the bowl 86 of the second type of bowl cover 38 is shown. The bowl 86 may be configured as a portion of a sphere or a substantially spherical cap as previously discussed. The bowl 86 may extend across the bowl opening 52 and may extend away from the axle housing 30 such that the bowl 86 may be disposed furthest from the axle housing 30 proximate the center axis 80.

Various features that may be provided with either type of bowl cover will now be described. The features may be classified as structural features, lubricant management features, and auxiliary features. All or some of these features may be provided with either type of bowl cover 38.

Structural features may include a set of ribs 130, a suspension mount 132, one or more shock absorber brackets 134, a snorkel 136, a breather hole 138, and a baffle 140.

Referring to FIG. 5, the set of ribs 130 may be disposed on the outer surface 100 of the bowl 86 and may extend away from the axle housing 30. In at least one embodiment, the ribs may be spaced apart from each other and may be arranged in a repeating pattern. In FIG. 5, the ribs 130 are disposed substantially parallel to each other and extend in a generally vertical direction; however, it is contemplated that the ribs 130 may extend horizontally or at an angle between horizontal and vertical directions. The ribs 130 may provide multiple functions. First, the ribs 130 may help reinforce the bowl 86 and may help inhibit torsion or twisting of the axle housing 30. Second, the ribs 130 may also help transmit heat from inside the axle assembly 10 to outside the axle assembly 10. For example, heat or thermal energy may be conducted through the bowl cover 38 to one or more ribs 130 and then from one or more ribs 130 to the surrounding environment or ambient air outside the axle assembly 10 via convection. Heat or thermal energy may be transmitted from a lubricant 142, such as oil, that may contact the inner surface 102 of the bowl 86. Third, one or more ribs 130 may help protect other features of the bowl cover 38 from damage.

Referring to FIG. 5, the suspension mount 132 may facilitate mounting of a component of a vehicle suspension, such as a mounting bracket for a shock absorber or other suspension component. The suspension mount 132 may be disposed on the outer surface 100 and may extend away from the axle housing 30. In FIG. 5, the suspension mount 132 is disposed between a pair of ribs 130 and may be disposed along the center axis 80.

Referring to FIG. 4, one or more shock absorber brackets 134 may extend from the outer surface 100 of the bowl 86. The shock absorber brackets 134 may facilitate mounting of a shock absorber. In FIG. 4, two shock absorber brackets 134 are shown. For convenience in reference, the shock absorber bracket 134 to the left of the ring gear receiving portion 114 will be designated a first shock absorber bracket and the shock absorber bracket 134 to the right of the ring gear receiving portion 114 will be designated a second shock absorber bracket. Each shock absorber bracket 134 may include a shock absorber mounting hole 150 and a support 152.

The first shock absorber bracket 134 may extend from the first wall 110 to the ring gear receiving portion 114. The shock absorber mounting hole 150 may receive a fastener that may couple the shock absorber or a shock absorber mounting bracket to the bowl cover 38. The support 152, which may be called a first support with reference to the first shock absorber bracket, may be disposed proximate an end of the first shock absorber bracket 134 that may be disposed opposite the ring gear receiving portion 114. The first support 152 may extend from the first wall 110 and may help support the first shock absorber bracket 134. The first shock absorber bracket 134 may have a first length L1 that may extend from the ring gear receiving portion 114 to the end of the first shock absorber bracket 134.

The second shock absorber bracket 134 may be disposed on an opposite side of the ring gear receiving portion 114 from the first shock absorber bracket 134. The second shock absorber bracket 134 may extend from the second wall 112 to the ring gear receiving portion 114. The support 152, which may be called a second support with reference to the second shock absorber bracket, may be disposed proximate an end of the second shock absorber bracket 134 that may be disposed opposite the ring gear receiving portion 114. The second support 152 may extend from the second wall 112 and may help support the second shock absorber bracket 134. The second shock absorber bracket 134 may have a second length L2 that may extend from the ring gear receiving portion 114 to the end of the second shock absorber bracket 134. The length L2 of the second shock absorber bracket 134 may be greater than the length L1 of the first shock absorber bracket 134 when the ring gear receiving portion 114 is offset from the center line 120 of the bowl cover 38.

Figure 7:
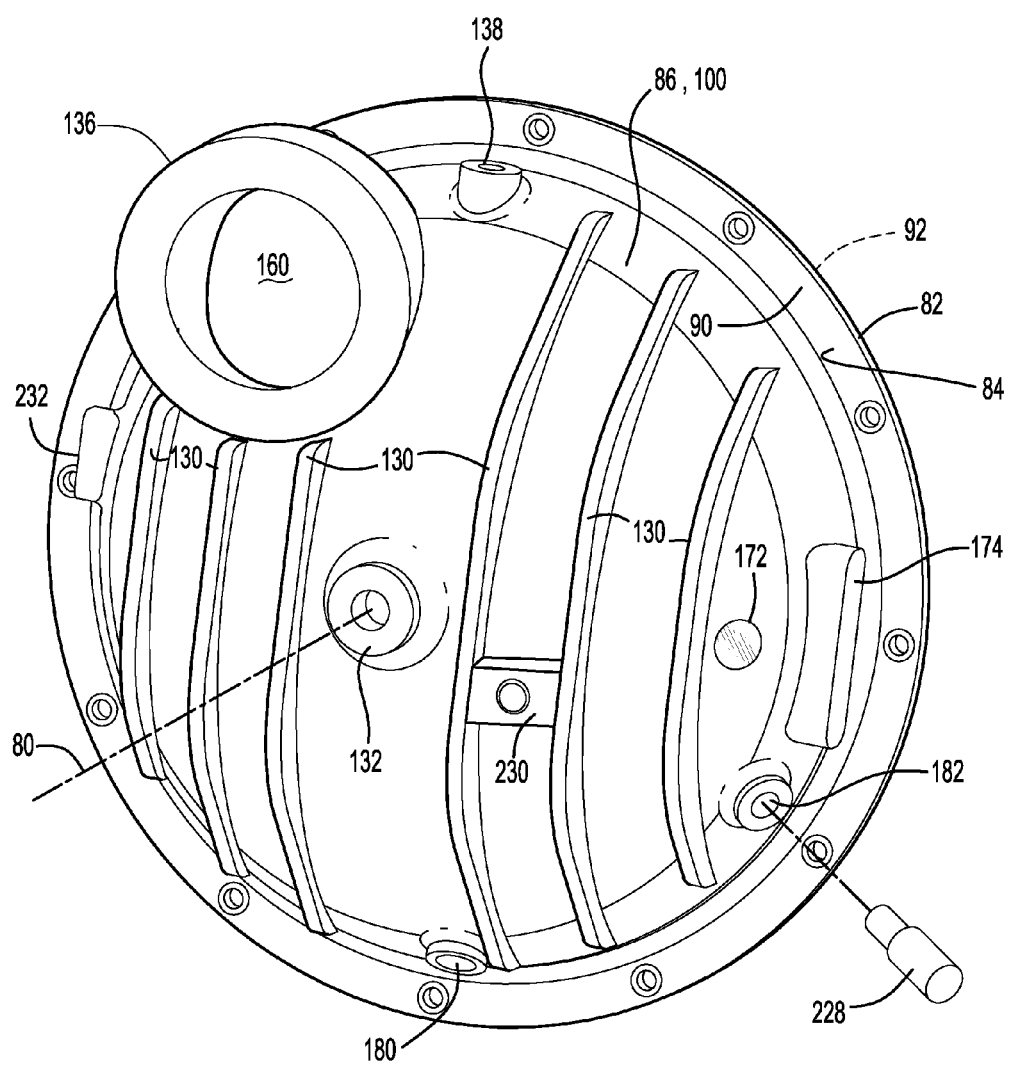
FIGS. 7 and 8 are perspective views of a fourth embodiment of a bowl cover.
Figure 8:
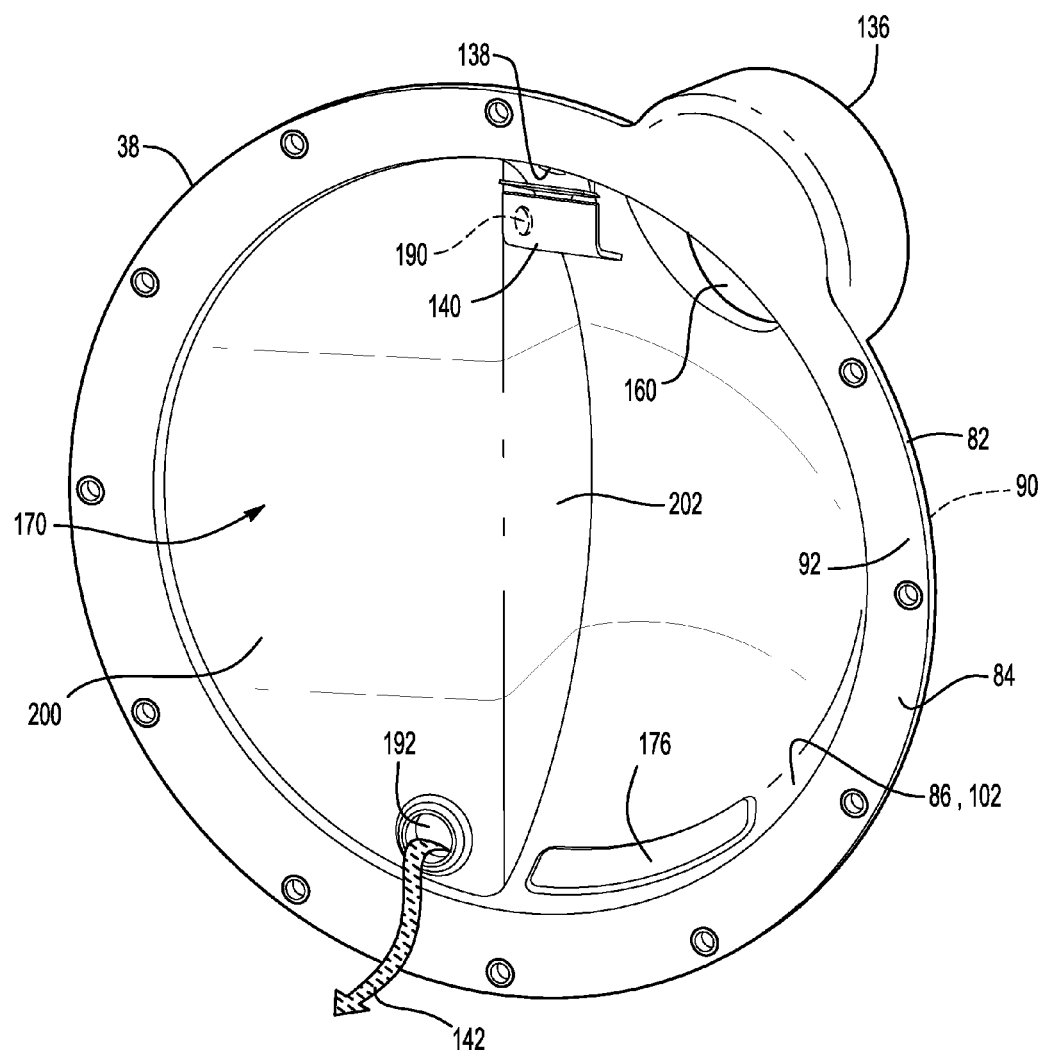

Referring to FIGS. 7 and 8, the snorkel 136 may be provided on a bowl cover 38 of a front-rear axle assembly. The snorkel 136 may extend away from the axle housing 30. For instance, the snorkel 136 may extend from the flange 84 and the outer surface 100 of the bowl 86. The snorkel 136 may define a snorkel hole 160 that may extend through the bowl cover 38. The snorkel hole 160 may receive an output shaft that may be operatively coupled to the differential 34 and may provide torque from a first axle assembly, such as a front-rear axle assembly, to a second axle assembly, such as a rear-rear axle assembly. The snorkel hole 160 may also receive and facilitate mounting of components associated with the output shaft. For example, the snorkel hole 160 may receive one or more roller bearings that may rotatably support the output shaft. The snorkel hole 160 may also facilitate mounting of a seal that may extend around the output shaft and inhibit contaminants from entering the snorkel hole 160. Optionally, the snorkel hole 160 may receive a sleeve or reinforcement insert that may reinforce the snorkel 136 and may facilitate mounting of such components. The bowl cover 38 may allow the snorkel 136 or snorkel hole 160 to be moved inboard to facilitate lower or more desirable prop shaft angles or driveline angles between the first and second axle assemblies.

Referring to FIGS. 3-8 a breather hole 138 may extend through the bowl 86. The breather hole 138 may allow air to enter and exit the axle assembly 10 to help balance the air pressure inside the axle assembly 10 with the air pressure outside the axle assembly 10. For instance, the breather hole 138 may vent heated air from inside the axle assembly 10 to reduce internal air pressure on one or more seals of the axle assembly 10. The breather hole 138 may be located above a static lubricant level of the axle assembly 10, or above a level that lubricant is expected to reach when the axle assembly 10 is filled with an amount of lubricant specified by the manufacturer. As such, the breather hole 138 may be configured or positioned to not allow lubricant to exit the axle assembly 10. In FIGS. 3-8, the breather hole 138 is located near the top of the bowl 86. In FIG. 5, the breather hole 138 is also located near the top end 116 of the ring gear receiving portion 114 and is located above the center axis 80 and suspension mount 132.

Figure 6:
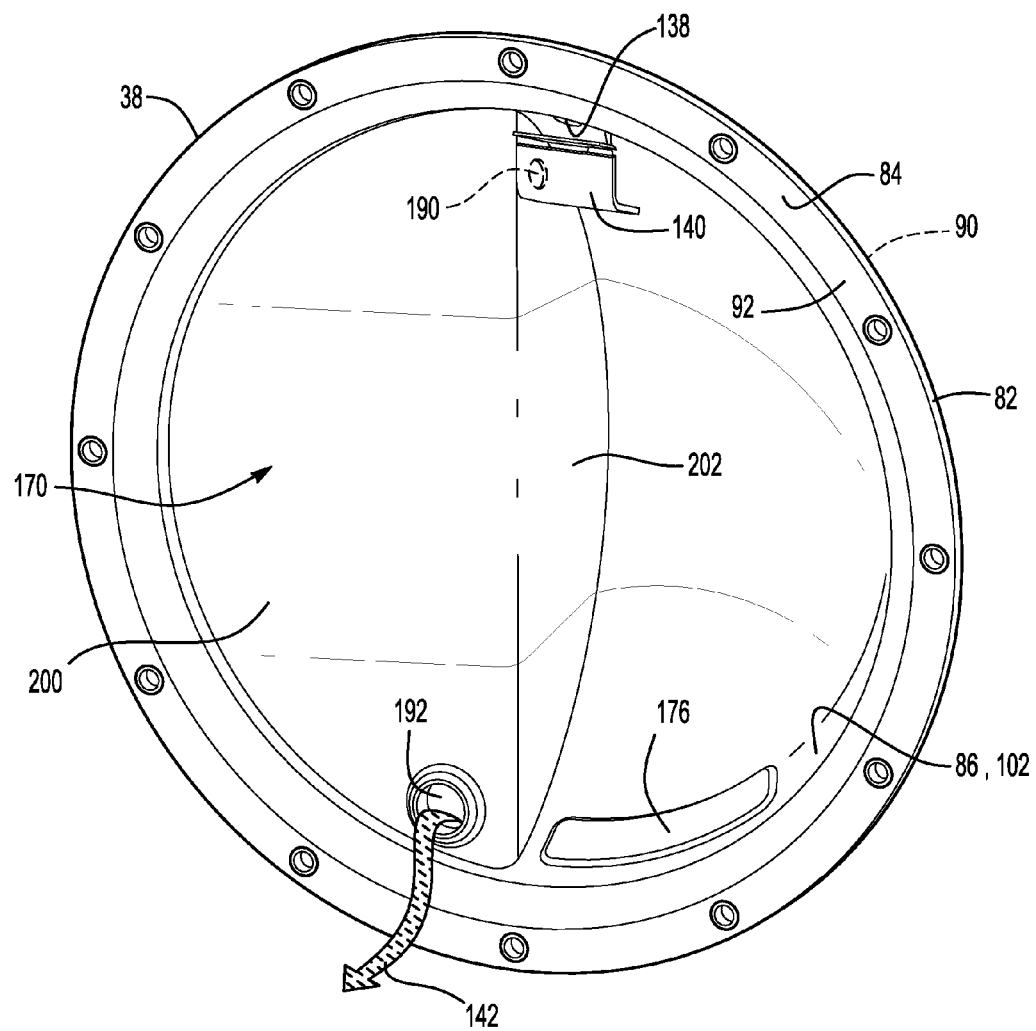

Referring to FIGS. 6 and 8, an example of a baffle 140 is shown. The baffle 140 may inhibit lubricant 142 from exiting the axle assembly 10 through the breather hole 138. The baffle 140 may be disposed inside the bowl cover 38 proximate the breather hole 138. For example, the baffle 140 may be disposed below the breather hole 138 and may be disposed between the ring gear 60 and the breather hole 138 to help block lubricant that splashes off the ring gear 60 from entering the breather hole 138.

Lubricant management features of the bowl cover 38 may include a lubricant reservoir 170, a lubricant sight window 172, a lubricant level boss 174, one or more magnets 176, a lubricant filter holder 178, a lubricant drain 180, and a lubricant sensor boss 182.

Figure 9:
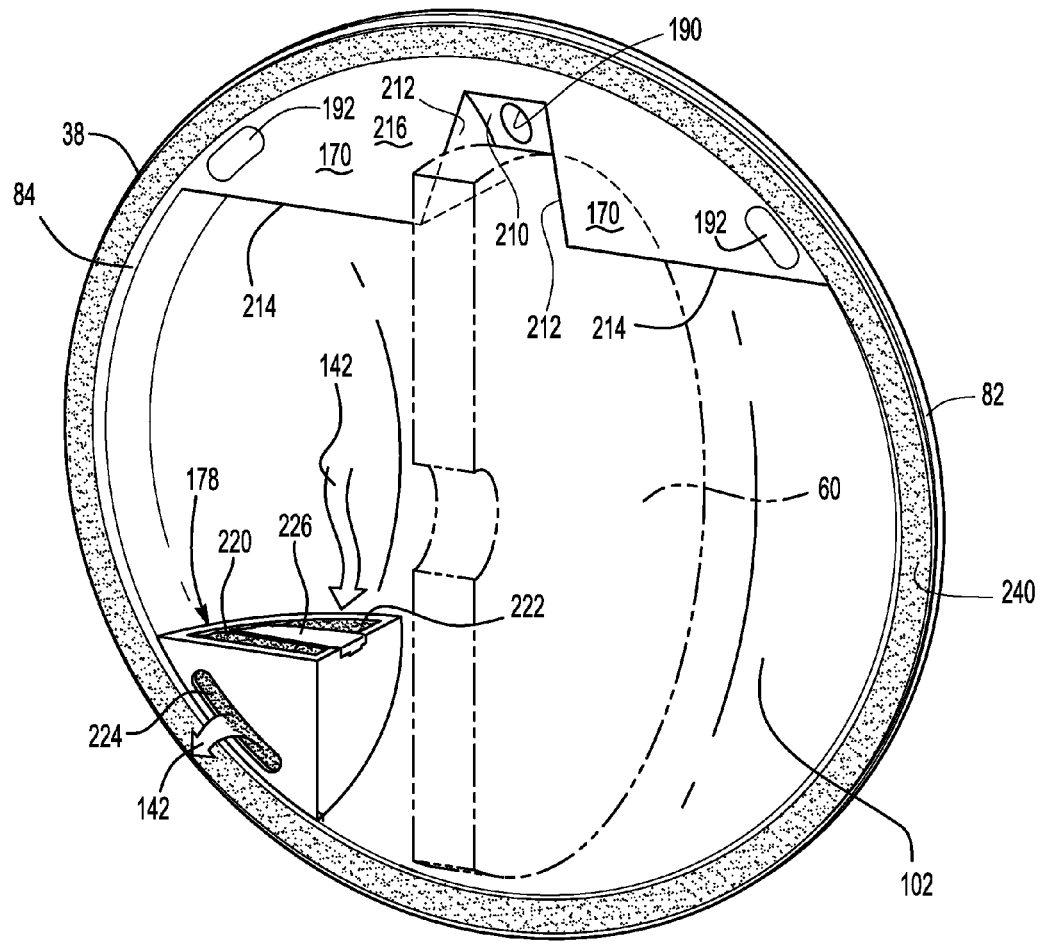
FIG. 9 is a perspective view of a fifth embodiment of a bowl cover.

Referring to FIGS. 6, 8 and 9, one or more lubricant reservoirs 170 may be provided with the bowl cover 38. A lubricant reservoir 170 may temporarily hold and retain lubricant 142. Moreover, the lubricant reservoir 170 may hold lubricant outside of the sump portion located near the bottom of the center portion 40 of the axle housing 30, thereby reducing the volume or level of lubricant in the sump portion that may exert drag forces on the ring gear 60, which may help reduce churning losses and may help improve fuel economy. The lubricant reservoir 170 may be completely defined by the bowl cover 38. As such, the lubricant reservoir 170 may extend away from the axle housing 30. The lubricant reservoir 170 may include at least one inlet 190 and at least one outlet 192.

The inlet 190 may receive lubricant 142 that may splash off of the ring gear 60 and lubricant that may drip or flow down the inner surface 102 of the bowl 86. The inlet 190 may also receive lubricant via one or more channels that may capture and direct lubricant to the inlet 190. Such channels may be integrally formed in the bowl cover 38 or may be provided as separate components.

The outlet 192 may allow lubricant 142 to exit the lubricant reservoir 170 and flow to the axle housing 30. The outlet 192 may be disposed below the inlet 190 and may be sized to provide a desired lubricant flow rate.

Referring to FIGS. 6 and 8, an example of a lubricant reservoir 170 is shown. The lubricant reservoir 170 may be disposed proximate the flange 84 and may be at least partially defined by the bowl 86, a first lubricant reservoir wall 200, and a second lubricant reservoir wall 202.

The first lubricant reservoir wall 200 may be disposed proximate the flange 84 and may extend from the bowl 86. In at least one embodiment, the first lubricant reservoir wall 200 may face toward the axle housing 30 and may be disposed substantially parallel to the flange 84. The outlet 192 may be provided in the first lubricant reservoir wall 200.

The second lubricant reservoir wall 202 may extend from an end of the first lubricant reservoir wall 200 in a direction that extends away from the axle housing 30. The second lubricant reservoir wall 202 may extend to the bowl 86. In at least one embodiment, the second lubricant reservoir wall 202 may be disposed substantially perpendicular to the first lubricant reservoir wall 200 and may be disposed adjacent to the ring gear 60. The inlet 190 may be provided in the second lubricant reservoir wall 202. In addition, the baffle 140 may extend from the second lubricant reservoir wall 202. For instance, the baffle 140 may be cantilevered from the second lubricant reservoir wall 202 and may be disposed below the inlet 190. The baffle 140 may also be configured to help capture and direct lubricant 142 to the inlet 190 in one or more embodiments.

Referring to FIG. 9, another example of a lubricant reservoir 170 is shown. In this example, the lubricant reservoir 170 may be disposed along the top of the bowl cover 38 and above the center axis 80 of the bowl cover 38. In addition, the lubricant reservoir 170 may be at least partially disposed above the ring gear 60 and may extend around or straddle the ring gear 60. The lubricant reservoir 170 may include an upper wall 210, a pair of side walls 212, a pair of lower walls 214, and an interface wall 216.

The upper wall 210 may be disposed above the ring gear 60. The inlet 190 may be provided in the upper wall 210 in one or more embodiments.

The side walls 212 may extend from the upper wall 210. For instance, the side walls 212 may be disposed on opposite sides of the ring gear 60 and may extend from the upper wall 210 to a corresponding lower wall 214. It is contemplated that the inlet 190 may be provided in a side wall 212 in one or more embodiments.

The lower walls 214 may extend from a corresponding side wall 212 to the bowl 86. The lower walls 214 may be disposed below the upper wall 210 and may define a bottom of the lubricant reservoir 170.

The interface wall 216 may face toward the axle housing 30. The upper wall 210, side walls 212, and lower walls 214 may extend from the interface wall 216 to the bowl 86. At least one outlet 192 may be provided in the interface wall 216. In FIG. 9, two outlets are shown. Each outlet 192 may be aligned with a corresponding conduit on the axle housing 30, such as a groove, tube, or channel. The conduit may route lubricant to a desired location, such as to the arm portions of the axle housing 30 or to rotating components (e.g., roller bearings) or wear surfaces.

Referring to FIGS. 3, 5, and 7, the lubricant sight window 172 that may facilitate visual inspection of lubricant 142 inside the bowl cover 38 or inside the lubricant reservoir 170. The lubricant sight window 172, which may also be called a lubricant sight glass may be molded into the bowl cover 38 or may be provided as a separate component. For instance, the lubricant sight window 172 may be molded into the bowl cover 38, such as with a two-shot injection molding process, and may be made of a transparent or semitransparent polymeric material that may allow the lubricant level to be visually measured. The lubricant sight window 172 may be provided in any suitable location. In FIG. 3, the lubricant sight window 172 is disposed on the ring gear receiving portion 114. In FIGS. 5 and 7, the lubricant sight window 172 is provided on the bowl 86 and may be disposed proximate the lubricant reservoir 170.

Referring to FIGS. 3-5 and 7, the lubricant level boss 174 may be disposed on the outer surface 100 of the bowl 86. The lubricant level boss 174 may provide a reinforced surface for providing a hole that may receive a lubricant sight window. As such, the lubricant level boss 174 may be provided instead of a separate fixed position lubricant sight window 172 in one or more embodiments. The lubricant level boss 174 may protrude from the bowl 86 and may extend away from the axle housing 30. In addition, the lubricant level boss 174 may be elongated in a substantially vertical direction. As such, the lubricant level boss 174 may allow a sight window to be installed at a desired height or vertical location to accommodate different axle assemblies or axle assemblies having different lubricant capacities.

Referring to FIGS. 6 and 8, one or more magnets 176 may be provided in the bowl cover 38. The magnet 176 may attract and retain debris, such as metallic particles or contaminants that may collect in the axle assembly 10. As such, the magnet 176 may hold metallic particles that may otherwise be transported by the lubricant 142 and that may damage or cause wear of moving axle assembly components, such as roller bearings. The magnet 176 may be disposed on the inner surface 102 of the bowl 86 or may be molded inside of the wall of the bowl 86. The magnet 176 may be located near the bottom of the bowl 86 where lubricant 142 may pool and may be disposed outside the lubricant reservoir 170 in one or more embodiments.

Referring to FIG. 9, the lubricant filter holder 178 may be integrally formed or molded as part of the bowl cover 38 rather than being provided as a separate component. The lubricant filter holder 178 may disposed on the inner surface 102 near the bottom of the bowl 86 proximate the flange 84. The lubricant filter holder 178 may receive a lubricant filter 220 and may have a lubricant filter holder inlet 222, a lubricant filter holder outlet 224, and a filter retainer clip 226.

The lubricant filter holder inlet 222 may receive lubricant 142 that may be splashed by the ring gear 60 or that may drip down the interior surface of the bowl 86 and direct such lubricant to the lubricant filter 220. The lubricant filter holder inlet 222 may be disposed proximate the top of the lubricant filter holder 178.

The lubricant filter holder outlet 224 may be disposed below the lubricant filter holder inlet 222. For example, the lubricant filter holder outlet 224 may be disposed proximate the bottom of the lubricant filter holder 178 near the flange 84. The lubricant filter holder outlet 224 may allow lubricant 142 that has been filtered by the lubricant filter 220 to exit the lubricant filter holder 178 and flow to the axle housing 30. The lubricant filter holder outlet 224 may be sized to provide a desired lubricant flow rate and to help prevent the lubricant filter holder 178 from overflowing.

The filter retainer clip 226 may be disposed proximate the lubricant filter holder inlet 222. The filter retainer clip 226 may help retain the lubricant filter 220. In at least one embodiment, the filter retainer clip 226 may be provided as a separate component and may pivot with respect to the lubricant filter holder 178 between an open position and a closed position. The lubricant filter 220 may be removed when the filter retainer clip 226 is in the open position. The lubricant filter 220 may be held in the lubricant filter holder 178 when the filter retainer clip 226 is in the closed position.

Referring to FIGS. 3-5 and 7, the lubricant drain 180 may be configured as a through hole that may extend through the bowl 86. The lubricant drain 180 may be disposed near the bottom of the bowl 86 and may receive a drain plug. Removal of the drain plug from the lubricant drain 180 may allow lubricant 142 to drain from the axle housing 30. In FIGS. 3 and 4, the lubricant drain 180 is disposed at the bottom end 118 of the ring gear receiving portion 114. In FIGS. 5 and 7, the lubricant drain 180 is disposed near the bottom of the bowl 86 proximate the flange 84. The lubricant drain 180 may extend from the lubricant reservoir 170 in one or more embodiments.

Referring to FIGS. 3-5 and 7, the lubricant sensor boss 182 may be configured as a through hole that may extend through the bowl 86. The lubricant sensor boss 182 may receive a lubricant sensor 228 that may detect one or more attributes of the lubricant 142 inside the bowl 86. For instance, the sensor may be a lubricant temperature sensor, lubricant level sensor, or lubricant quality sensor. The lubricant sensor boss 182 may protrude from the outer surface 100 of the bowl 86 and may be disposed below the center line 120 of the bowl cover 38 in one or more embodiments.

Auxiliary features that may be provided with the bowl cover 38 may include a backup camera 230 and a universal accessory mounting pad 232.

Referring to FIGS. 4 and 5, a backup camera 230 may be mounted to or provided with the bowl cover 38 that may help a driver see behind the vehicle. The backup camera 230 may be positioned on the outer surface 100 and may be disposed at any suitable location that is not obstructed by other vehicle components. In FIG. 5, the backup camera 230 is positioned between adjacent ribs 130 to help protect the backup camera 230 from damage.

Referring to FIGS. 5 and 7, the universal accessory mounting pad 232 may extend from the outer surface 100 of the bowl cover 38. The universal accessory mounting pad 232 may facilitate attachment of a retention feature or clip that may secure a wiring harness, pneumatic air line, or the like.

The axle assembly 10 may be assembled in different ways depending on the configuration of the axle housing 30, bowl ring 36, and the bowl cover 38. In general, the bowl ring 36 may be attached to the center portion 40 such that the bowl ring 36 may extend around the bowl opening 52 and the bowl cover 38 may be attached to the bowl ring 36. The bowl ring 36 may be attached to the center portion 40 before or after the bowl cover 38 is attached to the bowl ring 36. For instance, the bowl cover 38 may be attached to the bowl ring 36 with fasteners or an adhesive 240, an example of which is shown in FIG. 9, either before or after the bowl ring 36 is attached to the axle housing 30. As another example, the bowl ring 36 may be welded to the center portion 40 or otherwise fixedly attached to the center portion 40 before the bowl cover 38 is attached to the bowl ring 36, such as with fasteners or an adhesive 240 as previously discussed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an axle housing having a center portion that defines a bowl opening and a differential carrier opening that receives a differential that has a ring gear; and
    a bowl cover that is mounted to the axle housing, the bowl cover including:
        a first wall that at least partially covers the bowl opening;
        a second wall that is spaced apart from the first wall and that at least partially covers the bowl opening;
        a ring gear receiving portion that is disposed between the first wall and the second wall and that extends away from the axle housing, wherein the ring gear is received in the ring gear receiving portion; and
        a first shock absorber bracket that extends from the first wall and the ring gear receiving portion.

2. The axle assembly of claim 1 wherein the bowl cover further comprises a perimeter surface that extends around the bowl cover and a flange that extends from the perimeter surface, wherein the flange facilitates mounting of the bowl cover to the axle housing and wherein the flange extends around the first wall and the second wall.

3. The axle assembly of claim 2 wherein the first wall and the second wall are offset from the flange such that the first wall and the second wall are disposed further from the axle housing than the flange.

4. The axle assembly of claim 3 wherein the first wall and the second wall are substantially coplanar.

5. The axle assembly of claim 1 further comprising a breather hole that allows air to enter and exit the axle assembly.

6. The axle assembly of claim 5 wherein the breather hole extends through the ring gear receiving portion and is disposed proximate a top end of the ring gear receiving portion.

7. The axle assembly of claim 1 wherein the first shock absorber bracket includes a first support that extends from the first wall and that is disposed proximate an end of the first shock absorber bracket that is disposed opposite the ring gear receiving portion.

8. The axle assembly of claim 1 wherein the bowl cover includes a second shock absorber bracket that extends from the second wall and the ring gear receiving portion.

9. The axle assembly of claim 8 wherein the second shock absorber bracket includes a second support that extends from the second wall and that is disposed proximate an end of the second shock absorber bracket that is disposed opposite the ring gear receiving portion.

10. The axle assembly of claim 8 wherein the first shock absorber bracket is coplanar with the second shock absorber bracket.

11. The axle assembly of claim 1 wherein the bowl cover includes a backup camera.

12. The axle assembly of claim 1 wherein the bowl cover is disposed on a bowl ring that is disposed on the center portion and extends around the bowl opening.

13. The axle assembly of claim 12 wherein the bowl cover engages the bowl ring and does not engage the axle housing.

14. An axle assembly comprising:
    an axle housing having a center portion that defines a bowl opening and a differential carrier opening that receives a differential that has a ring gear; and
    a bowl cover that is mounted to the axle housing, the bowl cover including:
        a first wall that at least partially covers the bowl opening;
        a second wall that is spaced apart from the first wall and that at least partially covers the bowl opening;
        a ring gear receiving portion that is disposed between the first wall and the second wall and that extends away from the axle housing, wherein the ring gear is received in the ring gear receiving portion;

a first shock absorber bracket that extends from the first wall and the ring gear receiving portion; and a second shock absorber bracket that extends from the second wall and the ring gear receiving portion;

wherein the ring gear receiving portion is offset from a center line of the bowl cover such that the second shock absorber bracket has a greater length than the first shock absorber bracket.

15. The axle assembly of claim 14 wherein the bowl cover includes a backup camera.

16. The axle assembly of claim 15 wherein the backup camera directly engages the bowl cover.

17. The axle assembly of claim 14 wherein the first shock absorber bracket includes a first support that extends from the first wall and that is disposed proximate an end of the first shock absorber bracket that is disposed opposite the ring gear receiving portion.

18. The axle assembly of claim 14 wherein the second shock absorber bracket includes a second support that extends from the second wall and that is disposed proximate an end of the second shock absorber bracket that is disposed opposite the ring gear receiving portion.

19. The axle assembly of claim 14 further comprising a breather hole that allows air to enter and exit the axle assembly.

20. The axle assembly of claim 19 wherein the breather hole extends through the ring gear receiving portion and is disposed proximate a top end of the ring gear receiving portion.

21. The axle assembly of claim 14 wherein the bowl cover further comprises a perimeter surface that extends around the bowl cover and a flange that extends from the perimeter surface, wherein the flange facilitates mounting of the bowl cover to the axle housing and wherein the flange extends around the first wall and the second wall.

22. The axle assembly of claim 21 wherein the first wall and the second wall are offset from the flange such that the first wall and the second wall are disposed further from the axle housing than the flange.

* * * * *